(12) United States Patent
Eckhardt et al.

(10) Patent No.: US 12,039,139 B1
(45) Date of Patent: Jul. 16, 2024

(54) BIFURCATION OF RENDERED AND SYSTEM POINTING INDICIA TO ENABLE INPUT VIA A VIEWPORT

(71) Applicant: Freedom Scientific, Inc., Clearwater, FL (US)

(72) Inventors: Jost Eckhardt, Burlington, VT (US); Roxana Fischer, Rotterdam (NL)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

(21) Appl. No.: 17/848,839

(22) Filed: Jun. 24, 2022

(51) Int. Cl.
*G06F 17/00* (2019.01)
*G06F 3/04812* (2022.01)

(52) U.S. Cl.
CPC ................. *G06F 3/04812* (2013.01)

(58) Field of Classification Search
CPC .................................................. G06F 3/04812
See application file for complete search history.

(56) References Cited

U.S. PATENT DOCUMENTS

| | | | | |
|---|---|---|---|---|
| 6,483,525 B1* | 11/2002 | Tange | ................... | G06F 16/955 715/765 |
| 7,834,849 B2* | 11/2010 | Hunleth | ................ | G06F 3/0482 345/158 |
| 7,900,158 B2* | 3/2011 | Ngari | ....................... | G06F 3/14 345/660 |
| 8,489,445 B1* | 7/2013 | Berg | .................. | G06Q 30/0205 705/7.34 |
| 8,797,315 B1* | 8/2014 | Kuhne | .................... | G06F 3/048 715/230 |
| 8,869,062 B1* | 10/2014 | Voorhees | .............. | G06F 3/0485 715/784 |
| 10,078,417 B1* | 9/2018 | Eckhardt | .............. | G09B 21/008 |
| 10,627,982 B1* | 4/2020 | Eckhardt | .............. | G09B 21/008 |
| 10,656,806 B2* | 5/2020 | Jhawar | .................... | G06F 3/016 |
| 11,068,149 B2* | 7/2021 | Wilburn | ................ | G06F 3/0488 |
| 11,079,895 B2* | 8/2021 | Hong | .................. | G06F 3/04883 |
| 11,079,995 B1* | 8/2021 | Hulbert | ................. | G06F 3/0485 |
| 2006/0242605 A1* | 10/2006 | Kim | ........................ | G06F 9/451 715/857 |
| 2008/0259040 A1* | 10/2008 | Ording | ............... | G06F 3/04886 345/173 |
| 2010/0070912 A1* | 3/2010 | Zaman | .................. | G06F 3/0481 715/784 |
| 2010/0079498 A1* | 4/2010 | Zaman | .................. | G06F 3/0481 345/661 |
| 2010/0083186 A1* | 4/2010 | Zaman | .................. | G06F 3/0481 715/856 |

(Continued)

*Primary Examiner* — Mohammed H Zuberi
(74) *Attorney, Agent, or Firm* — Dennemeyer & Associates LLC; Victoria Friedman

(57) ABSTRACT

A method of enabling a user of a computing device to provide input via a viewport displayed on a display monitor. The viewport is displayed over a first region of the graphic user interface (GUI), and a second region of the GUI is displayed within the viewport. When the user positions the system pointing indicium at the first region of the graphic user interface, the system pointing indicium is placed into the second GUI region, while a separate viewpoint pointing indicium is displayed over the viewport. When a user provides an input, the input is applied at the current position coordinates of the system pointing indicium.

12 Claims, 11 Drawing Sheets

(56) References Cited

U.S. PATENT DOCUMENTS

| | | | |
|---|---|---|---|
| 2010/0283800 A1* | 11/2010 | Cragun | G09B 21/008 345/661 |
| 2011/0283227 A1* | 11/2011 | Moore | G06F 3/0481 715/803 |
| 2012/0293558 A1* | 11/2012 | Dilts | G06F 3/04812 345/676 |
| 2013/0113801 A1* | 5/2013 | Monson | G06T 1/20 345/426 |
| 2013/0257721 A1* | 10/2013 | Stringer | G09G 5/08 345/157 |
| 2013/0321461 A1* | 12/2013 | Filip | G06F 3/147 345/632 |
| 2014/0223280 A1* | 8/2014 | Choudhury | G06F 3/04812 715/234 |
| 2015/0116309 A1* | 4/2015 | Ofstad | G06T 13/20 345/419 |
| 2015/0309693 A1* | 10/2015 | Li | G06F 3/0488 715/711 |
| 2016/0182579 A1* | 6/2016 | Tsang | H04L 65/1069 709/204 |
| 2016/0330260 A1* | 11/2016 | Ruge | G06F 3/04812 |
| 2016/0349970 A1* | 12/2016 | Everitt | G06F 3/04883 |
| 2017/0052373 A1* | 2/2017 | Memmott | G06F 3/0346 |
| 2018/0329609 A1* | 11/2018 | De Swarte | G06T 11/206 |
| 2019/0369829 A1* | 12/2019 | Turner | G06F 3/0488 |
| 2021/0055857 A1* | 2/2021 | Seymour | G06F 3/0238 |
| 2022/0139051 A1* | 5/2022 | Jones | G06T 7/73 345/633 |
| 2023/0110323 A1* | 4/2023 | Chen | H04N 21/42204 725/44 |

\* cited by examiner

BIFURCATION OF RENDERED AND SYSTEM POINTING INDICIA TO ENABLE INPUT VIA A VIEWPORT

BACKGROUND OF THE INVENTION

1. Field of the Invention

The described embodiments relate generally to accessibility software for low-vision user of computing devices. More specifically, the described embodiments pertain to a method of bifurcating a rendered system pointing indicium and the system pointing indicium, to enable a user to interact with a control element displayed within a viewport.

2. Description of the Related Art

Low-vision computer users often have a need to view certain content of a graphic user interface (GUI) at a higher magnification level. One way of fulfilling this need involves displaying a viewport, in which a region of the GUI is displayed at a higher magnification level. One example of such method is described in U.S. Pat. No. 10,627,982 (the '982 Patent). The '982 Patent describes a primary viewport through which the computing device receives user query. The resultant output is then displayed in a secondary viewport. It is a natural tendency for a user to wish to interact with the content displayed in the secondary viewport, however, according to the currently known magnification software such interaction is not possible.

FIGS. 1A-1C illustrate the aforementioned shortcoming of the currently known magnification software applications. FIG. 1A depicts a display monitor 12, on which a GUI 14 is displayed. A viewport 16 is displayed over a first region of GUI 14. Viewport 16 contains a visual rendering of a second GUI region 15 at an increased magnification level, enabling a low-vision user to better see and discern control element 18 located within second GUI region 15. As depicted in FIG. 1B, according to currently known magnification software applications, if a user were to place a pointing indicum 20 in a location that coincides with a viewport 16, system pointing indicium 20 would be positioned underneath viewport 16. If a user were to provide an input—for example, by clicking a mouse button—while system pointing indicium 20 is positioned at the location of viewport 16, the computing system would apply that input to the first region of GUI 14 lying underneath viewport 16, rather than to control element 18.

One reason for this behavior is that viewport 16 merely displays a magnified visual rendering 22 of control element 18, while the actual control element 18 is positioned within second GUI region 15, away from viewport 16. FIG. 1C depicts that, under the currently known magnification applications, a user would be required to visually locate control element 18 within second GUI region 15 (which may be a difficult task for low-vision users), move system pointing indicium 20 into the second GUI region 15, position pointing indicum 12 over control element 18, and then provide the predefined input (e.g., a mouse button click) to execute an action associated with control element 18. This process is inefficient, unintuitive, and distracting.

Thus, what is needed is a method of enabling a user to interact with the visual rendering of the control element displayed within the viewport, without having to position the pointing indicium at the location of the actual system control element, which may be in a different region of the display monitor or even outside the boundaries of the display monitor.

SUMMARY OF THE INVENTION

In an embodiment, the invention pertains to a method of enabling a user to provide an input through a viewport displayed over a graphic user interface (GUI) on a display monitor. The GUI is displayed on the display monitor, and the viewport is displayed over a first region of the GUI. A visual rendering of a second region of the GUI, which is located away from the first region of the GUI, is displayed within the viewport. The second region of the GUI may be rendered at a higher magnification level within the viewport than the default magnification level at which the second GUI region is displayed outside the viewport. An input control located within the second region of the graphic user interface is visually rendered within the viewport. The input control may be rendered at a higher magnification level, increasing the user's ability to see and discern the input control.

In the next step, the method identifies current coordinates of a system pointing indicium. As used herein, the term "system pointing indicium" refers to a set of coordinates relative to the display monitor at which a user input is applied. Next, the method determines whether the current coordinates of the system pointing indicium coincide with the first region of the GUI. If they do, then a viewport pointing indicium is displayed over the viewport at the current coordinates, while the system pointing indicium is placed at a corresponding location within the second region of the GUI. As used herein, the term "viewport pointing indicium" refers to a visual rendering of a pointing indicium displayed over the viewport. The viewport pointing indicium may be rendered as a pointer, a caret, a hand icon, or any other visual representation known in the art. Furthermore, the viewport pointing indicium may be displayed at a higher magnification level or with different visual attributes than the default system pointing indicium. In an embodiment, when the viewport pointing indicium is displayed on the display monitor, the system pointer indicium is hidden.

When the user provides a first predefined user input (for example, movement of a mouse or a tap on a touchscreen), the viewport pointing indicium is displayed over the visual rendering of the input control within the viewport. Simultaneously, based on the calculated offset values, the system pointing indium is positioned over the input control in the second region of the GUI. When a user provides a second predefined user input (for example, a mouse click or a tap on the touchscreen) while the viewport pointing indicium is displayed over the visual rendering of the input control within the viewport, the computing device executes an action associated with the system pointing indicium positioned at the input control element within the second region of the GUI. The executed action may launch a software application associated with the input control.

In an embodiment, if the user moves the viewport pointing indicium to new coordinates outside the first region of the GUI, the system pointing indicium is displayed at the new coordinates. At this point, the computing system may stop displaying the viewport pointing indicium.

In an embodiment, the user may adjust the position of the viewport relative to the display monitor. Irrespective of the position of the viewport relative to the display monitor, the viewport will continue to display a visual rendering of the second GUI region.

The viewport may be displayed automatically (for example, as a pop-up) when the input control within the second region of the GUI comes into focus—for example, as an output to a user query. The viewport may be a secondary viewport displaying an output in response to a user query entered via a primary viewport. Furthermore, as the user moves the viewport pointing indicium about the viewport, the system pointing indicium automatically moves in synchronization about the second region of the GUI.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
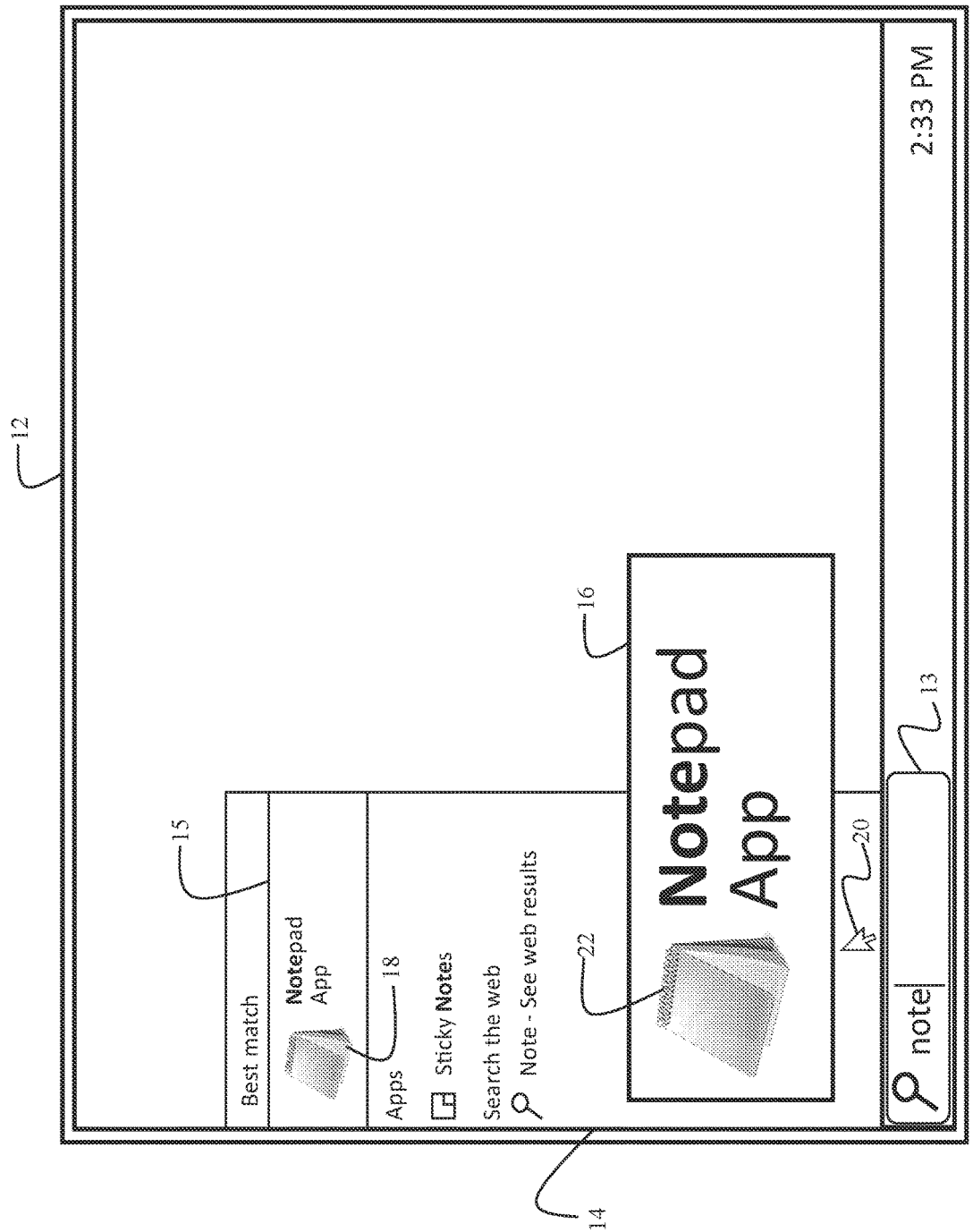
FIG. 1A depicts a GUI displayed on a display monitor, with a viewport being displayed over a first portion of the GUI.
Figure 1B:
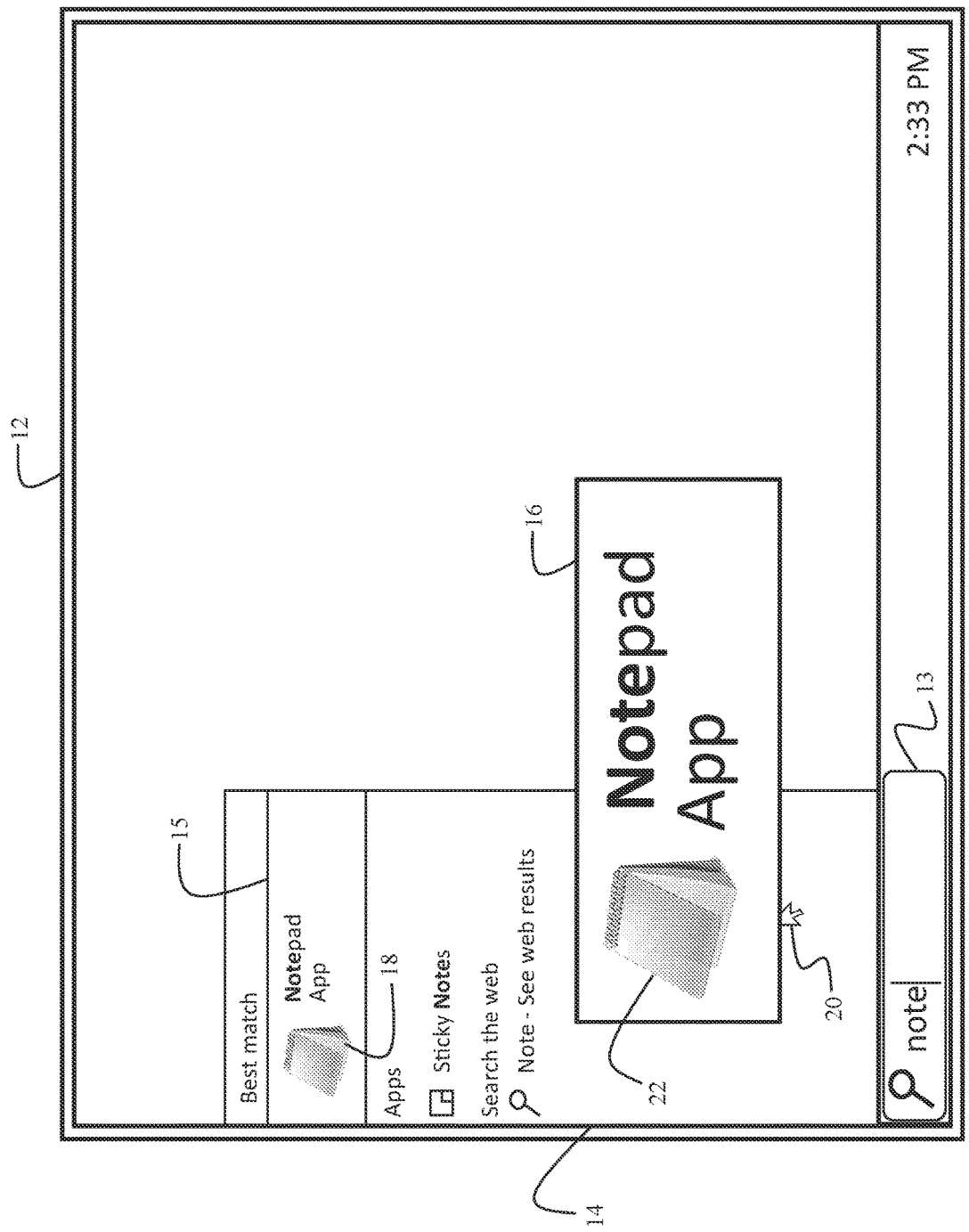
FIG. 1B depicts that when a pointing indicium is positioned in the first portion of the GUI, the pointing indicium is obstructed by the viewport.
Figure 1C:
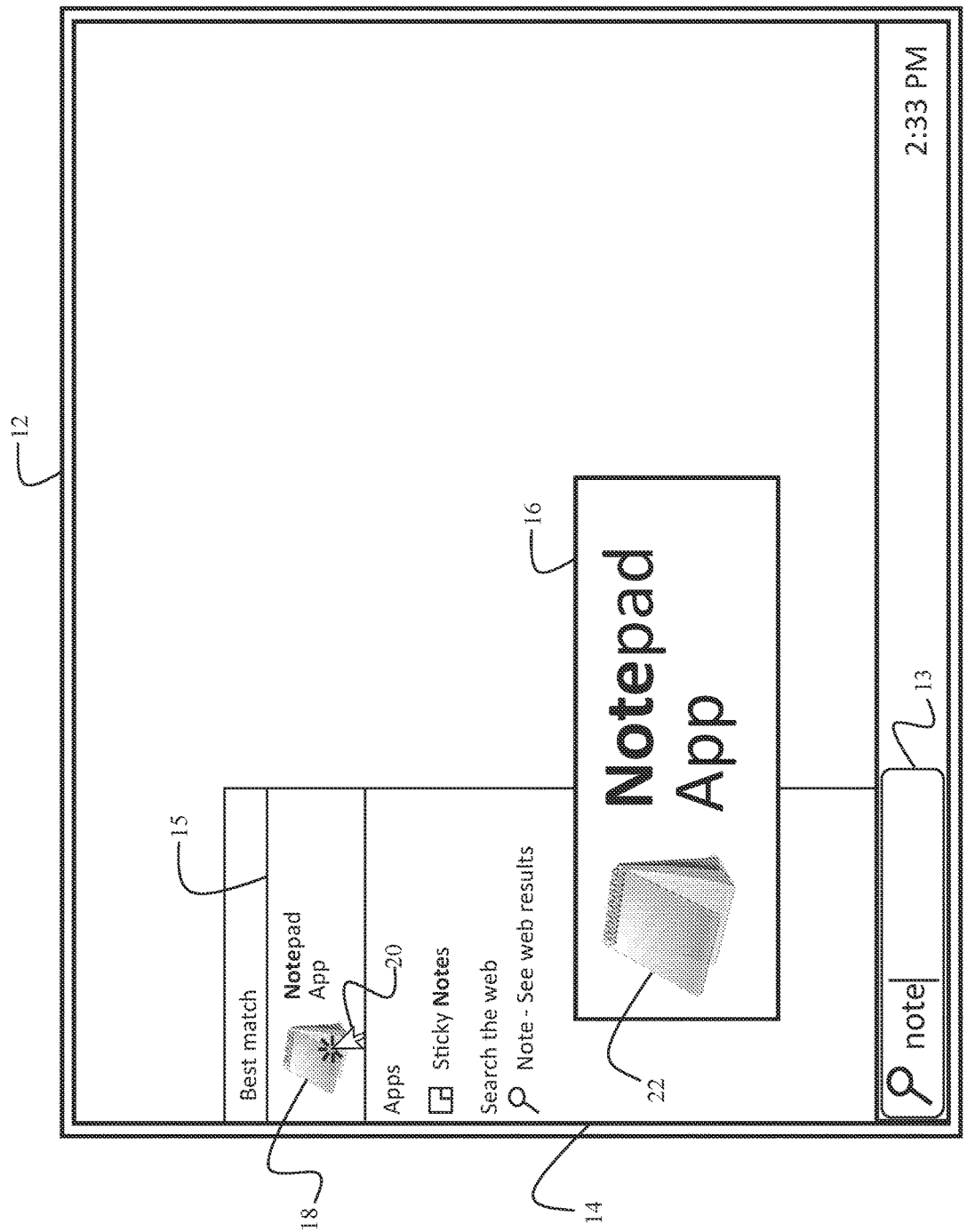
FIG. 1C depicts that to interact with a control element displayed in the viewport, the user must move the pointing indicium outside the viewport and into a second region of the GUI in which the source control element is located.

The Background section explains technological shortcomings of currently known magnification software applications resolved by the present invention. FIGS. 1A-1C illustrate an example of one such shortcoming. FIG. 1A depicts a graphic user interface (GUI) 14 displayed on a display monitor 12. In this example, when a user enters the word "note" into the GUI search filed 13, a search result is displayed within a second GUI region 15. Second GUI region 15 includes a control element 18 (e.g., a GUI icon) which the user can actuate using a system pointing indicium 20 to execute an action associated therewith—in this example, launching the Notepad App.

FIG. 1A further depicts that the magnification software application displays a viewport 16 over a first region of GUI 14. Viewport 16 displays second GUI region 15 including a magnified visual rendering 22 of control element 18. In this manner, viewport 16 enables the user to view the output to the search query "note" at an increased zoom level. However, because viewport 16 only displays a visual rendering 22 of control element 18 (while actual control element 18 is located in second GUI region 15, away from viewport 16), a user cannot actuate or otherwise interact with magnified visual rendering 22 of control element 18.

FIG. 1B depicts that if a user were to move system pointing indicium 20 into the first GUI region, over which viewport 16 is displayed, system pointing indicium 20 would be partially or fully obstructed by viewport 16. If the user were to provide an input—for example, via click of a mouse button or other input means—while system pointing indicium 20 is positioned in the first GUI region underneath viewport 16, the computing system would perform an action associated with the first GUI region, rather than control element 18, which is located in second GUI region 15.

FIG. 1C depicts that to actuate control element 18, the user would be required to move pointing indicium 20 into second GUI region 15 and then provide an input (for example, a mouse button click) while system pointing indicium 20 is positioned over control element 18 within second GUI region 15. The inability to interact with magnified visual rendering 22 of control element 18 displayed within viewport 16 is a major shortcoming of currently known magnification software applications.

Figure 2A:
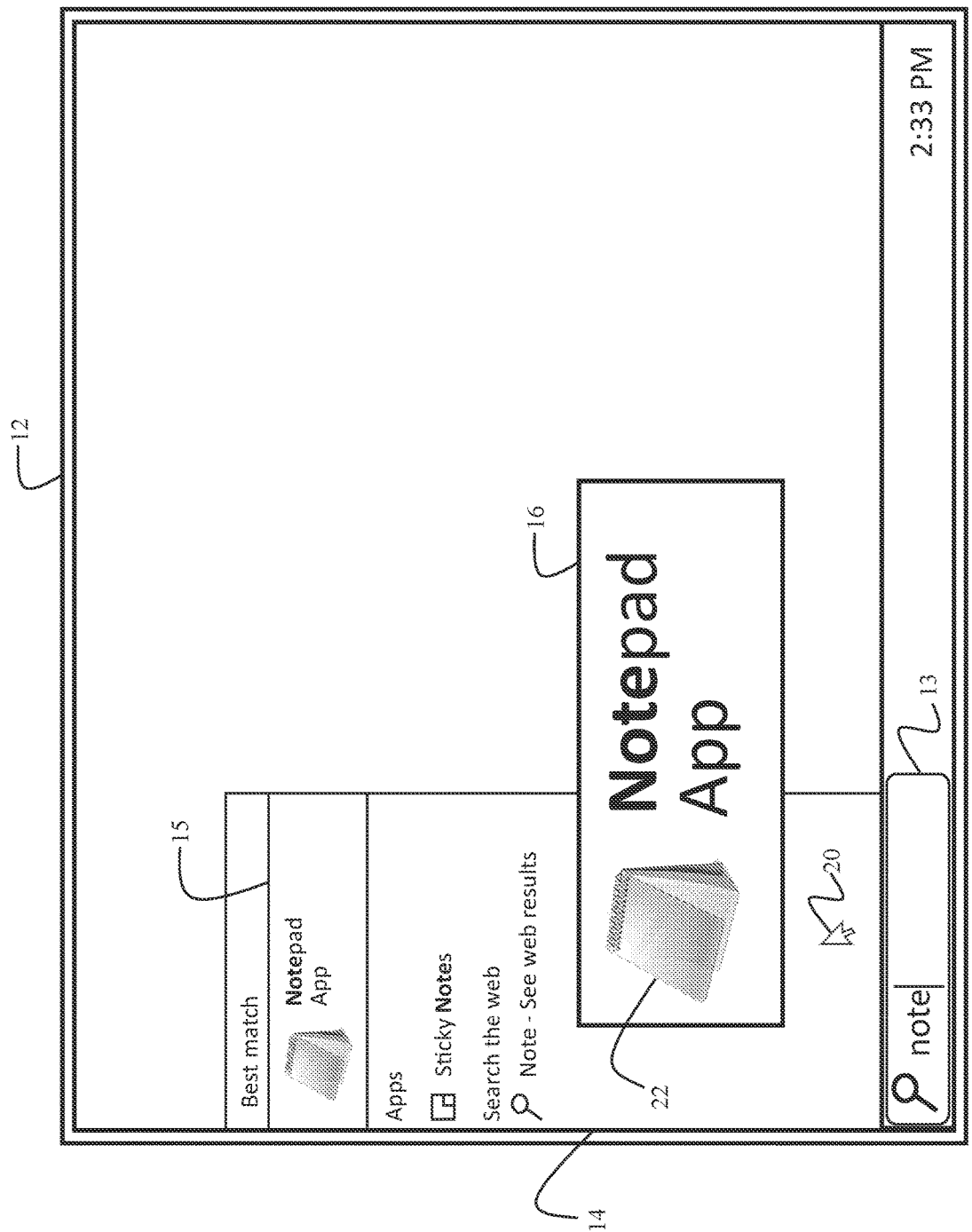
FIG. 2A depicts a GUI displayed on a display monitor, with a viewport being displayed over a first region of the GUI, wherein the viewport displays a second region of the GUI.

FIGS. 2A-2F depict an exemplary embodiment of a novel and nonobvious method that resolves the technological shortcomings identified above. FIG. 2A depicts display monitor 12 displaying GUI 14. In this example, a user inputs a search query "note" into an input search field 13. The output response to this query is provided in second GUI region 15 and includes a control element 18, which can be actuated via a predefined user input.

FIG. 2A depicts a viewport 16 displayed over a first region of GUI 14. Viewport 16 displays a visual rendering of second GUI region 15 at an increased magnification level, including a visual rendering 22 of control element 18. A system pointing indicium 20 is displayed over GUI 14. A user can move pointing indicum 20 about GUI 14 using a mouse, a trackpad, a touchscreen, a gesture, or any other means known in the art.

Figure 2B:
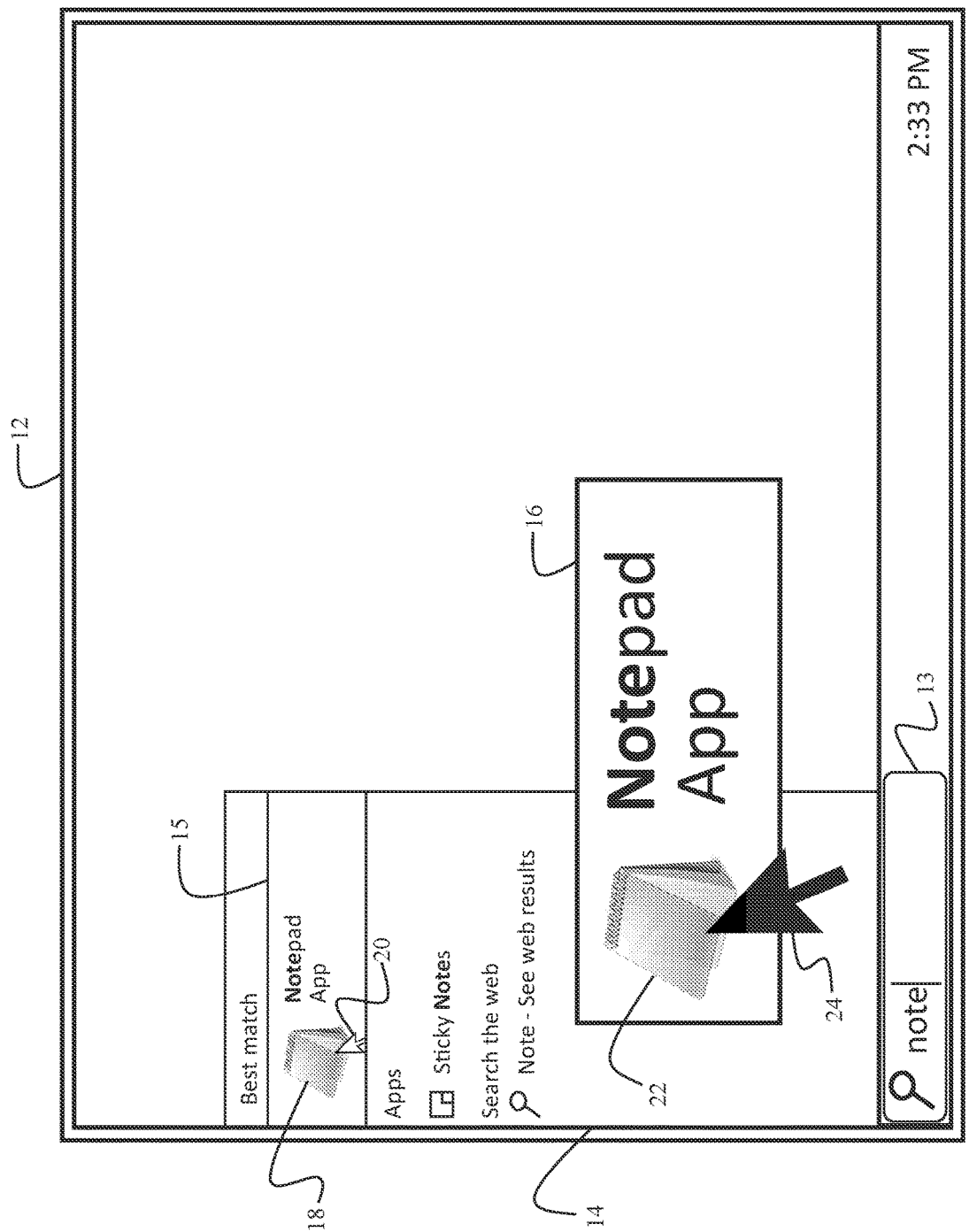
FIG. 2B depicts that when a user positions the pointing indicium in the first region of the GUI, a viewport pointing indicium is displayed over the viewport, while a system pointing indicium is automatically placed in the second region of the GUI.

FIG. 2B depicts that the user provided a first predefined input (e.g., moved the mouse or touched an area of the display monitor 12) placing system pointing indicium 20 at coordinates corresponding to the first GUI region, over which viewport 16 is displayed. Instead of placing system pointing indicium 20 underneath viewport 16—as would have been done under currently known magnification applications (see FIG. 1B)—in the present invention, a viewport pointing indicium 24 is displayed over viewport 16. In an embodiment, viewport pointing indicium 24 may be displayed at an increased magnification level and may have a different visual appearance than system pointing indicium 20.

The magnification software according to an embodiment of the invention calculates the offset between the GUI content displayed within viewport 16 and the corresponding source content within second GUI region 15. FIG. 2B depicts that, based on the calculated offset distances in the x and y directions, system pointing indicium 20 is offset from viewport pointing indicium 24. In this manner, system pointing indicium 20 is automatically positioned at a location within second GUI region 15 corresponding to the current position of viewport pointing indicium 24 relative to the GUI content displayed within viewport 16.

In an embodiment, system pointing indicium 20 can be positioned at the appropriate source location by calling the predefined method of the operating system—for example, SetCursorPos(x,y). Thus, system pointing indicium 20 automatically "jumps" into second GUI region 15 when the user positions system pointing indicium 20 within first GUI region over which viewport 16 is displayed. In an embodiment, system pointing indicium 20 may be hidden while viewport pointing indicium 24 is displayed on display monitor 12. In this manner, only one pointing indicium—viewport pointing indicium 24—is displayed on display monitor 12, during user interaction with viewport 16.

Figure 2C:
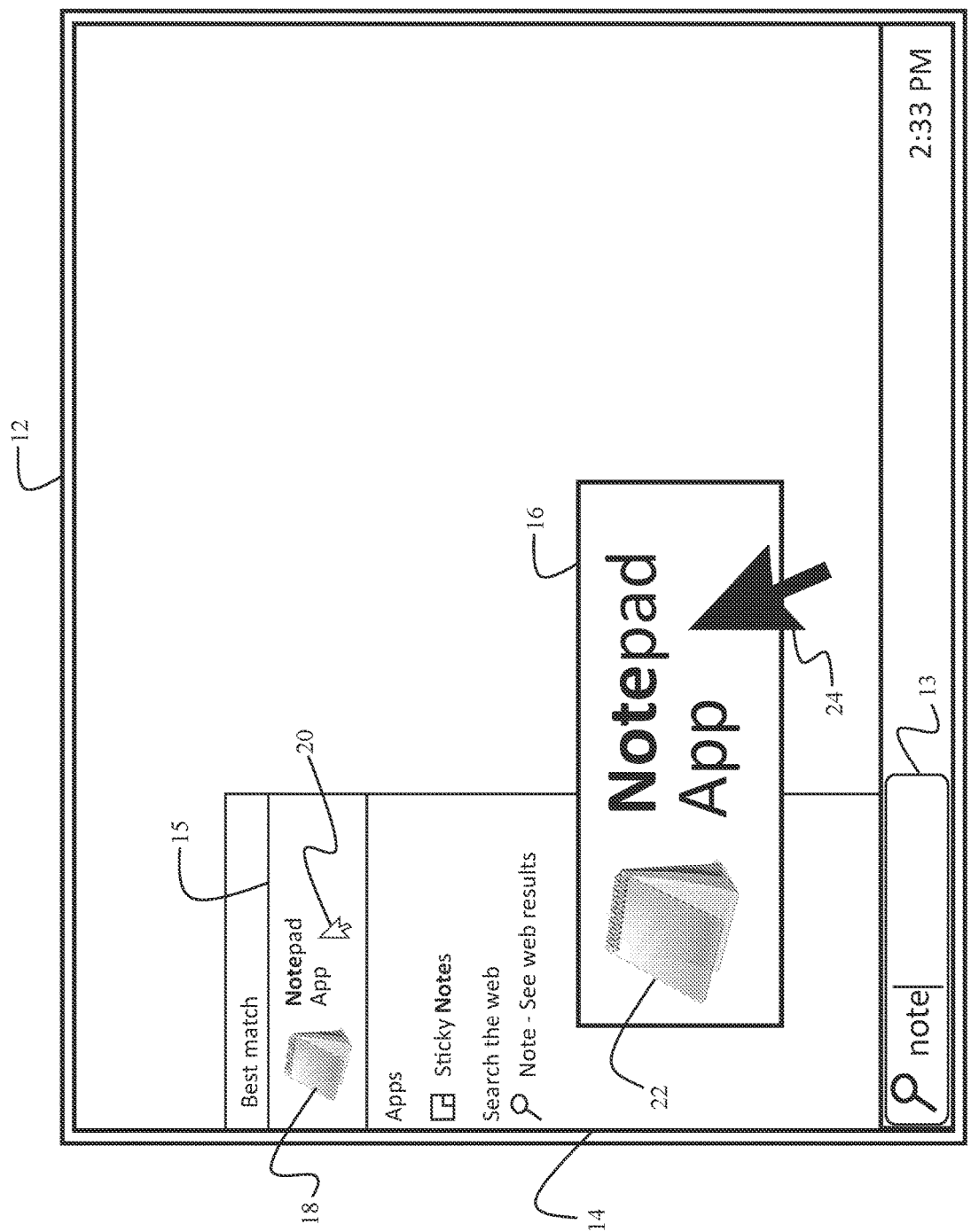
FIG. 2C depicts that when a user moves the viewport pointing indicium about the viewport, the system pointing indicium moves accordingly about the second region of the GUI displayed within the viewport.

FIG. 2C depicts that as the user moves viewport pointing indicium 24 about viewport 16, system pointing indicium 20 moves in a synchronized manner about second GUI region 15. The position of system pointing indicium 20 relative to the second GUI region 15 corresponds to the respective position of viewport pointing indicium 24 relative to the rendering of second GUI region 15 displayed within viewport 16. As explained above, system pointing indicium 20 may remain hidden.

Figure 2D:
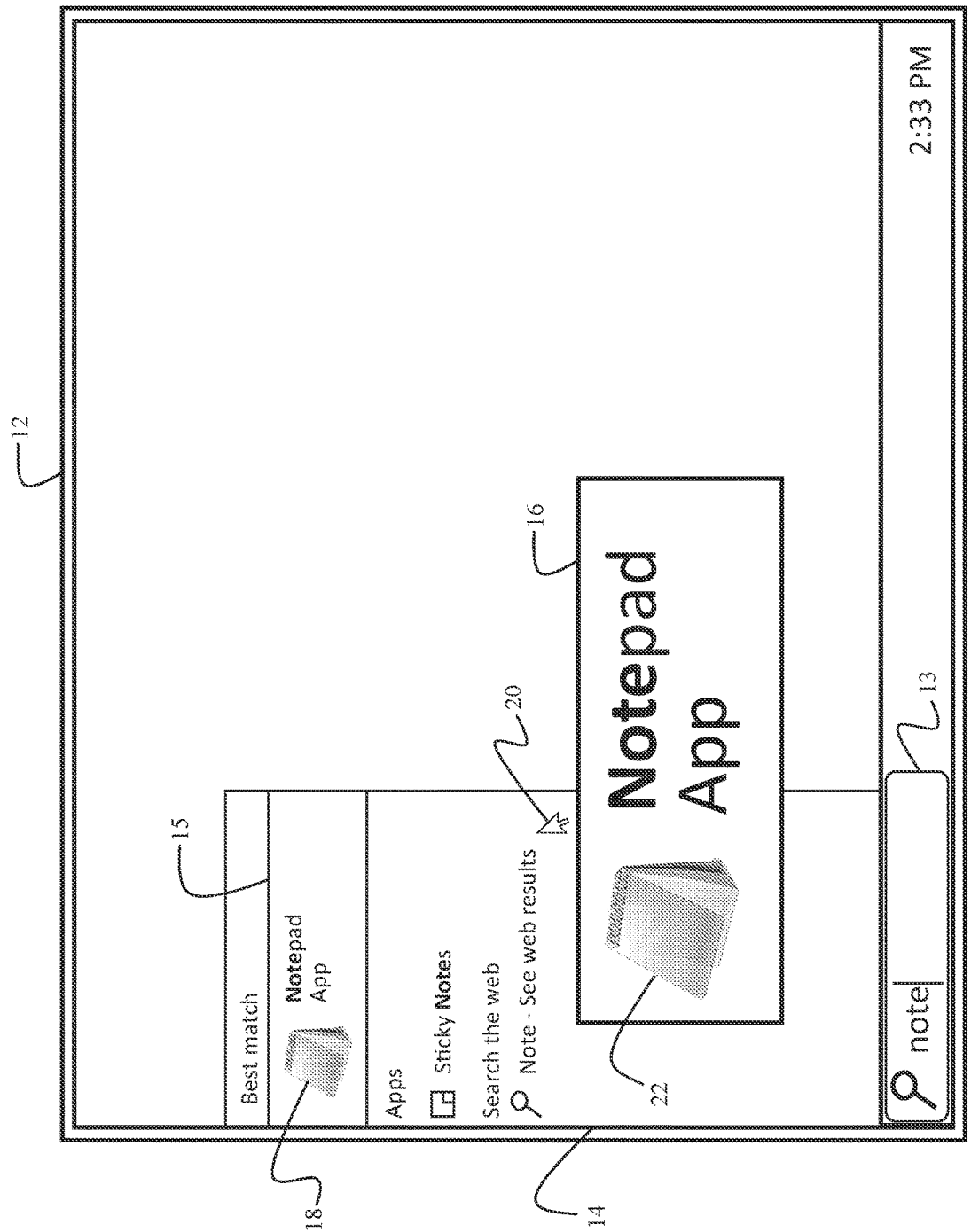
FIG. 2D depicts that if the user moves the viewport pointing indicium to new coordinates away from the viewport, the system pointing indicium is automatically placed and displayed at the new coordinates.

FIG. 2D depicts that when the user positions viewport pointing indicium 24 at new coordinates outside viewport 16, viewport pointing indicium 24 is no longer displayed, and instead, system pointing indicium 20 is displayed at the new coordinates. In this manner, when the user navigates outside viewport 16, system pointing indicium 20 automatically "jumps" from second GUI region 15, where it was previously positioned, to the new coordinates indicated by the user.

To summarize the sequence depicted in FIGS. 2A-2D: when the user moves system pointing indicium 20 into the first region of GUI 14, over which viewport 16 is displayed, the offset values between rendered content displayed within viewport 16 and the source GUI content are calculated. Based on the calculated offset values, system pointing indicium 20 is automatically placed into second GUI region 15. Simultaneously, viewport pointing indicium 24 is displayed over viewport 16. As the user moves viewport pointing indicium 24 about viewport 16, system pointing indicium 20 moves in a synchronized manner about second GUI region 15.

Figure 2E:
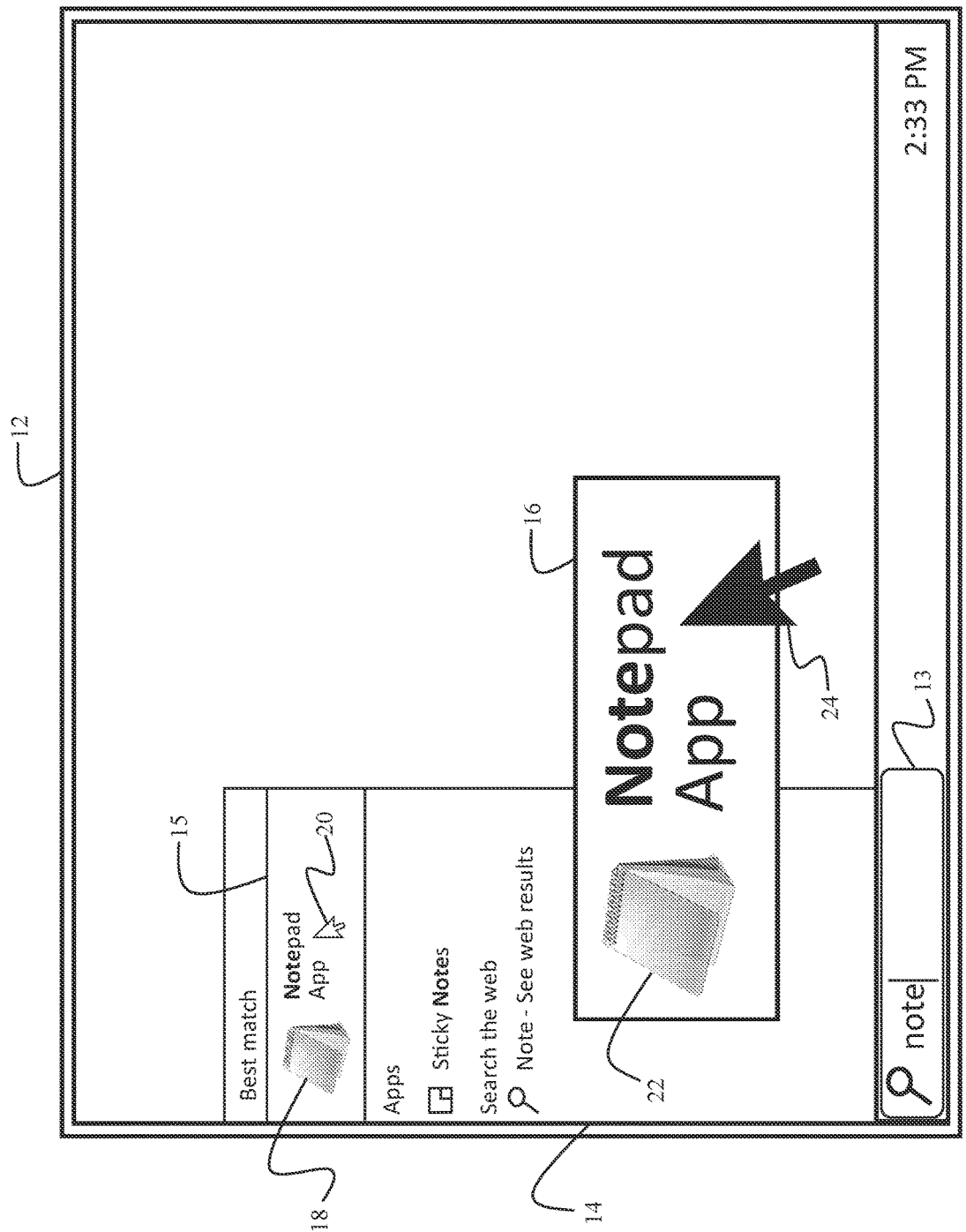
FIG. 2E depicts that when the user positions the pointing indicium over the viewport, the software application automatically bifurcates the viewport pointing indicium and the system pointing indicium, displaying the viewport pointing indicium over the viewport, while placing the system pointing indicium into the corresponding location within the second region of the GUI.
Figure 2F:
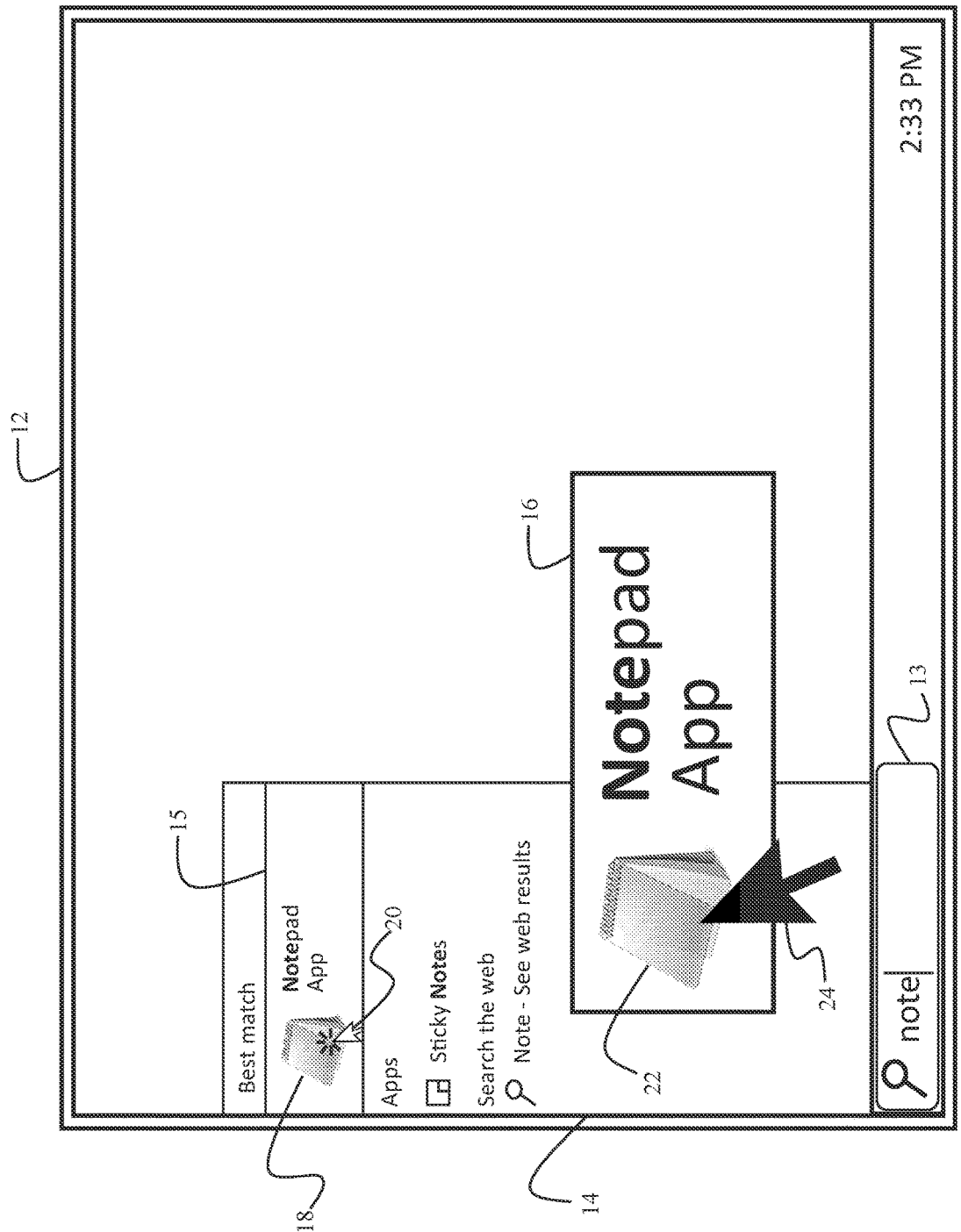
FIG. 2F depicts that in response to a user input while the rendered pointing indicium is displayed over a rendered control element displayed within the viewport, the user input is applied at the location of the system pointing indicium over the source control element displayed within the second region of the GUI.

FIG. 2E depicts that when the user moves system pointing indicium 20 back into the first region of GUI 14, viewport pointing indicium 24 reappears over viewport 16, while system pointing indicium 20 is automatically placed in the corresponding location within second GUI region 15. FIG. 2F depicts that a user provides an input (e.g., moves the mouse or taps the screen) that positions viewport pointing indicium 24 over a visual rendering 22 of control element 18. Based on the calculated offset distances in the x and y directions, system pointing indicium 20 is automatically positioned over the actual source control element 18 in second GUI region 15. If the user were to provide an input—for example, using a mouse, a trackpad, a touchscreen, a gesture, a voice command, or any other means—while viewport pointing indicium 24 is displayed over viewport 16, the computing system would apply the received input at the location of system pointing indicium 20, rather than viewport pointing indicium 24. Thus, when a user provides an input—for example, a mouse button click—while viewport pointing indicium 24 is displayed over visual rendering 22 of control element 18, the computing system applies the input at the location of system pointing indicium 20. In this manner, the user perceives his interaction with visual rendering 22 of control element 18 as if it were with the actual system control element 18, including hover effects, right-button mouse clicks, left-button mouse clicks, double clicks, etc.

Figure 2G:
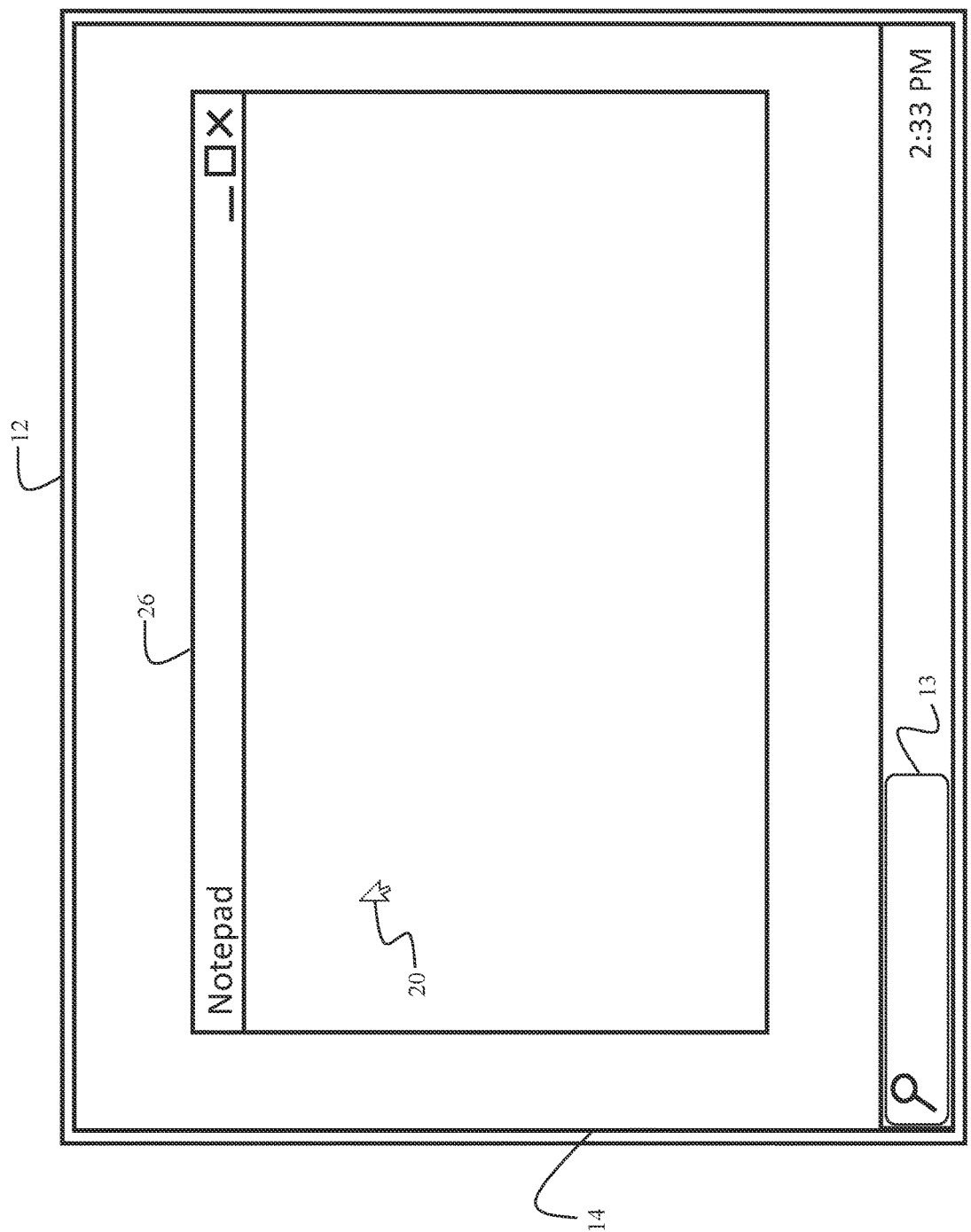
FIG. 2G depicts an exemplary action being executed in response to receiving a user input while the rendered pointing indicium is displayed over a control element within the viewport, as depicted in FIG. 2F.

FIG. 2G depicts that when the user provides a predefined input while viewport pointing indicium 24 is displayed over visual rendering 22 of control element 18, the computing system applies that input at the current location of system pointing indicium 20. In this example, in response to such user input, the computing system launches Notepad application 26 and closes viewport 16.

Figure 3:
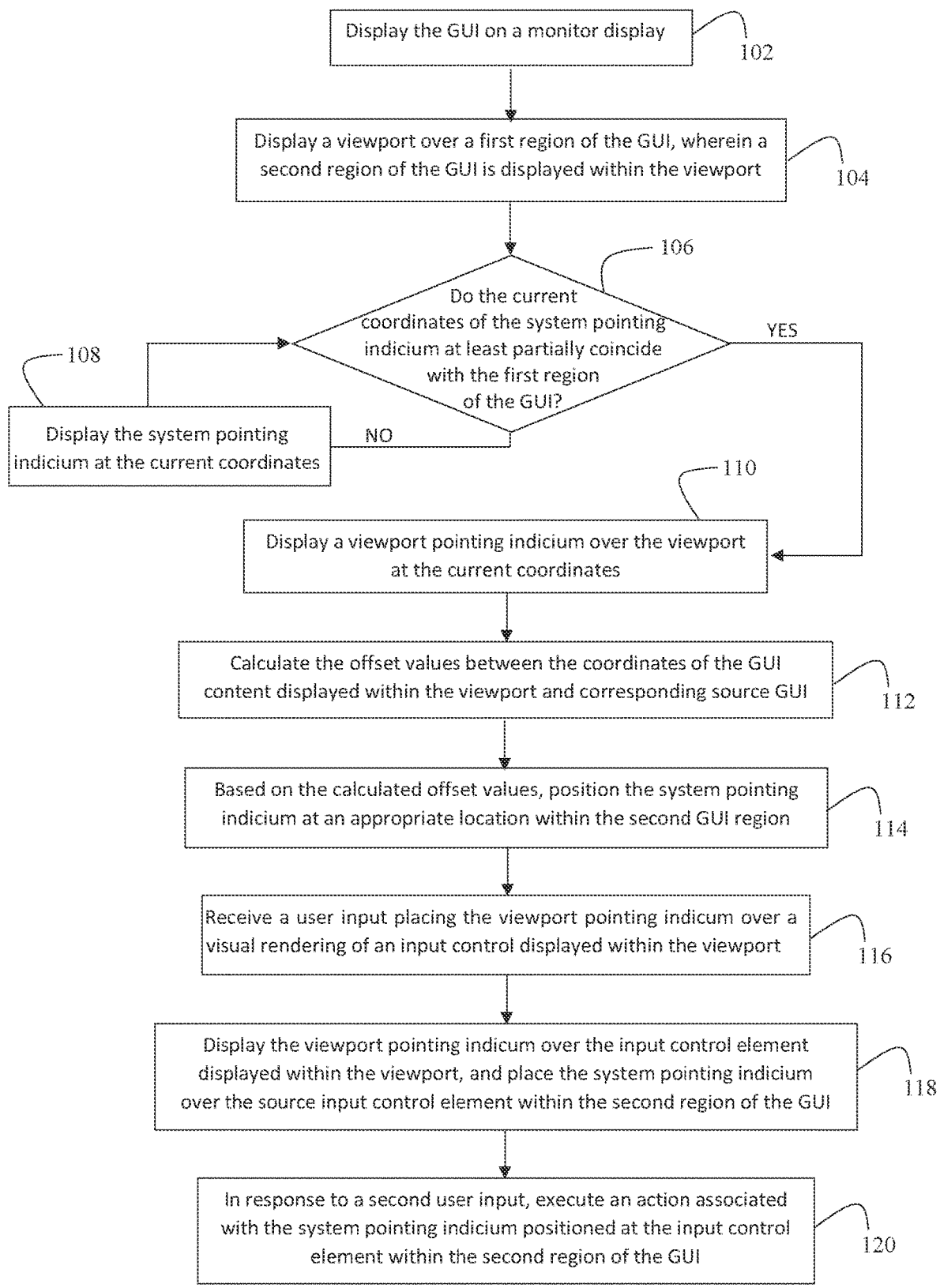
FIG. 3 depicts a flowchart illustrating an exemplary method according to which an embodiment of the invention operates.

FIG. 3 is a flowchart illustrating the method described above. In step 102, GUI 14 is displayed on display monitor 12. In step 104, viewport 16 is displayed over a first region of GUI 14, wherein a visual rendering of second GUI region 15 is displayed within viewport 16. Next, in step 106, the method determines whether the current coordinates of system pointing indicium 20 coincide with the first GUI region over which viewport 16 is displayed. If the current coordinates of system pointing indicium 20 are outside the first GUI region, then in step 108, system pointing indicium 20 is displayed at the current coordinates.

However, if it is determined that the current coordinates of system pointing indicum 20 are within the first GUI region, then the method proceeds to step 110, in which a viewport pointing indicium 24 is displayed over viewport 16. In step 112, the offset values between the GUI content displayed within viewport 16 and the source GUI content within second GUI region 15 are calculated. In step 114, based on the calculated offset values, system pointing indicum 20 is positioned at the source GUI content within second GUI region 15. In this manner, software application bifurcates system pointing indicium 20 and viewport pointing indicium 24, wherein the user's input relative to viewport pointing indicium 24 is mapped to the source GUI content within second GUI region 15. System pointing indicium 20 may be hidden, so that only viewport pointing indicium 24 is displayed on display monitor 12.

In step 116, the user positions viewport pointing indicium 24 over a visual rendering 22 of control element 18 displayed within viewport 16. In step 118, viewport pointing indicium 24 is displayed over visual rendering 22 of control element 18, while system pointing indicium 20 is placed at the location of the actual control element 18 within second GUI region 15. In step 120, the user provides an input (for example, a mouse button click). In response to this input, the computing system applies the input at the location of system pointing indicium 20, executing the predefined action associated with control element 18.

In this manner, the user is provided with a front-end experience of interacting with visual rendering 22 of control element 18 within viewport 16, while on the back end, the computing system applies the user input at the source control element 18 within a second GUI region 15. Thus, the current invention resolves the technical shortcoming of the currently known magnification software applications.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of enabling a user to provide an input through a viewport displayed over a graphic user interface on a display monitor, the method comprising the steps of:
   displaying the graphic user interface on the display monitor,
   displaying the viewport over the graphic user interface, where a position of the viewport over graphic user interface is adjustable relative to the display monitor;
   displaying a visual rendering of a region of the graphic user interface within the viewport, the visual rendering magnified relative to the graphic user interface, and wherein an input control on the graphic user interface is magnified within the viewport;
   maintaining the visual rendering of the region of the graphic user interface within the viewport when the position of the viewport is adjusted relative to the display monitor;
   identifying current coordinates of a system pointing indicium relative to the graphic user interface, the system pointing indicium movable over the graphic user interface;
   determining whether the current coordinates of the system pointing indicium coincide with the region of the graphic user interface magnified within the viewport;
   responsive to determining that the current coordinates of the system pointing indicium coincide within the coordinate boundaries of the region of the graphic user interface magnified within the viewport, displaying a magnified viewport pointing indicium within the viewport and placing the system pointing indicium in the second region of the graphic user interface;
   responsive to determining that the current coordinates of the system pointing indicium fall outside the coordinate boundaries of the region of the graphic user interface displayed within the viewport, hiding the magnified viewport pointing indicium from the viewport;
   responsive to receiving a user input while the magnified viewport pointing indicium is displayed over a magnified visual rendering of the input control within the viewport, executing an event of the input control within the graphic user interface.

2. The method of claim 1, wherein responsive to determining that the magnified viewport pointing indicium has been moved to new coordinates outside the viewport, displaying the system pointing indicium at the new coordinates on the graphic user interface.

3. The method of claim 1, wherein the viewport is displayed automatically when the input control comes into focus.

4. The method of claim 1, wherein the system pointing indicium changes position within the graphic user interface in response to the magnified viewport pointing indicium changing position within the viewport.

5. The method of claim 1, wherein the viewport is a secondary viewport displaying an output in response to a user input entered via a primary viewport.

6. The method of claim 1, wherein the system pointing indicium is hidden when the magnified viewport pointing indicium is displayed.

7. A non-transitory computer readable medium storing a set of instructions thereon that when executed by a computer processor enable a user to provide an input through a viewport displayed over a graphic user interface on a display monitor, the instructions comprising:
 displaying the graphic user interface on the display monitor;
 displaying the viewport over the graphic user interface, where a position of the viewport over graphic user interface is adjustable relative to the display monitor;
 displaying a visual rendering of a region of the graphic user interface within the viewport, the visual rendering magnified relative to the graphic user interface, and wherein an input control on the graphic user interface is magnified within the viewport;
 maintaining the visual rendering of the region of the graphic user interface within the viewport when the position of the viewport is adjusted relative to the display monitor;
 identifying current coordinates of a system pointing indicium relative to the graphic user interface, the system pointing indicium movable over the graphic user interface;
 determining whether the current coordinates of the system pointing indicium coincide with the region of the graphic user interface magnified within the viewport;
 responsive to determining that the current coordinates of the system pointing indicium coincide within the coordinate boundaries of the region of the graphic user interface magnified within the viewport, displaying a magnified viewport pointing indicium within the viewport and placing the system pointing indicium within the second region of the graphic user interface;
 responsive to determining that the current coordinates of the system pointing indicium fall outside the coordinate boundaries of the region of the graphic user interface displayed within the viewport, hiding the magnified viewport pointing indicium from the viewport;
 responsive to receiving a user input while the magnified viewport pointing indicium is displayed over a magnified visual rendering of the input control within the viewport, executing an event of the input control within the graphic user interface.

8. The non-transitory computer readable medium of claim 7, wherein responsive to determining that the magnified viewport pointing indicium has been moved to new coordinates outside the viewport, displaying the system pointing indicium at the new coordinates on the graphic user interface.

9. The non-transitory computer readable medium of claim 7, wherein the viewport is displayed automatically when the input control comes into focus.

10. The non-transitory computer readable medium of claim 7, wherein the system pointing indicium changes position within the graphic user interface in response to the magnified viewport pointing indicium changing position within the viewport.

11. The non-transitory computer readable medium of claim 7, wherein the viewport is a secondary viewport displaying an output in response to a user input entered via a primary viewport.

12. The non-transitory computer readable medium of claim 7, wherein the system pointing indicium is hidden when the magnified viewport pointing indicium is displayed.

* * * * *